US010793791B2

(12) United States Patent
Heraud et al.

(10) Patent No.: US 10,793,791 B2
(45) Date of Patent: Oct. 6, 2020

(54) USE OF A BIFUNCTIONAL CATALYST BASED ON ZEOLITE IZM-2 FOR THE HYDROISOMERIZATION OF LIGHT PARAFFINIC FEEDSTOCKS RESULTING FROM FISCHER-TROPSCH SYNTHESIS (71) Applicant: IFP Energies Nouvelles, Rueil-Malmaison (FR)

(72) Inventors: Jean-Philippe Heraud, Rueil-Malmaison (FR); Christophe Bouchy, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/513,819

(22) Filed: Jul. 17, 2019

(65) Prior Publication Data
US 2020/0024530 A1    Jan. 23, 2020

(30) Foreign Application Priority Data

Jul. 18, 2018 (FR) ..................................... 1856669

(51) Int. Cl.
*C10G 67/00* (2006.01)
*B01J 21/04* (2006.01)
(Continued)

(52) U.S. Cl.
CPC .............. *C10G 67/00* (2013.01); *B01J 21/04* (2013.01); *B01J 29/74* (2013.01); *B01J 37/0018* (2013.01);
(Continued)

(58) Field of Classification Search
CPC .......... C10G 2/30; C10G 45/58; C10G 45/62; C10G 45/64; C10G 65/043; C10G 65/12;
(Continued)

(56) References Cited

U.S. PATENT DOCUMENTS 9,586,828 B2    3/2017  Bouchy et al.
2011/0024328 A1  2/2011  Virdi et al.
2011/0180455 A1* 7/2011  Bouchy ................... B01J 37/08
                                                    208/49

FOREIGN PATENT DOCUMENTS

WO    0157160 A1    8/2001
WO    05012460 A1   2/2005
(Continued)

OTHER PUBLICATIONS

Search report in FR1856669 dated Apr. 5, 2019 (pp. 1-2).

*Primary Examiner* — Brian A McCaig
(74) *Attorney, Agent, or Firm* — Millen White Zelano & Branigan, PC (57) ABSTRACT A process is described for producing middle distillates from a paraffinic feedstock produced by Fischer-Tropsch synthesis and divided into a light fraction (cold condensate) and a heavy fraction (waxes). The process involves fractionation of the waxes to obtain a light fraction, the final boiling point of which is between 350° C. and 400° C., and a heavy fraction which boils above the light fraction. The light fraction is mixed with at least one portion of the cold condensate. The resultant mixture is hydrotreated in the presence of a hydrotreatment catalyst of at least one portion of the resultant effluent is hydroisomerized in the presence of a catalyst comprising at least one noble metal from Group VIII and at least one zeolite IZM-2. At least one portion of the heavy fraction is subjected to hydrocracking and hydroisomerization in the presence of a hydrocracking catalyst. The resultant effluents are fractionated to obtain at least one middle distillates fraction.

13 Claims, 4 Drawing Sheets (51) Int. Cl.
| | |
|---|---|
| *B01J 29/74* | (2006.01) |
| *B01J 37/00* | (2006.01) |
| *B01J 37/02* | (2006.01) |
| *B01J 37/08* | (2006.01) |
| *B01J 37/30* | (2006.01) |

(52) U.S. Cl.
CPC .......... *B01J 37/0207* (2013.01); *B01J 37/08* (2013.01); *B01J 37/30* (2013.01); *B01J 2229/186* (2013.01); *C10G 2300/1022* (2013.01); *C10G 2300/1085* (2013.01); *C10G 2300/202* (2013.01); *C10G 2300/301* (2013.01)

(58) Field of Classification Search
CPC ............ C10G 67/00; C10G 2300/1022; C10G 2300/1085; C10G 2300/202; C10G 2300/301; B01J 21/04; B01J 29/74; B01J 37/0018; B01J 37/0207; B01J 37/08; B01J 37/30
See application file for complete search history.

(56) References Cited

FOREIGN PATENT DOCUMENTS

| | | |
|---|---|---|
| WO | 09103881 A2 | 8/2009 |
| WO | 10015737 A1 | 2/2010 |

\* cited by examiner

USE OF A BIFUNCTIONAL CATALYST BASED ON ZEOLITE IZM-2 FOR THE HYDROISOMERIZATION OF LIGHT PARAFFINIC FEEDSTOCKS RESULTING FROM FISCHER-TROPSCH SYNTHESIS

FIELD OF THE INVENTION

The Fischer-Tropsch process makes it possible to produce synthetic hydrocarbons from a gaseous feedstock predominantly composed of hydrogen and of carbon monoxide, also known as synthesis gas ($CO+H_2$).

In particular, in the low-temperature Fischer-Tropsch process, the synthesis gas ($CO+H_2$) is converted catalytically into water, oxygen-comprising products and olefins and into essentially linear paraffins also known as n-paraffins, in the gas, liquid or solid form under standard conditions. After separation of the water, the synthetic hydrocarbons obtained are predominantly composed of predominantly linear paraffins but also contain olefins and oxygen-comprising products.

Generally, the effluent resulting from the Fischer-Tropsch process is, at the outlet of the Fischer-Tropsch synthesis unit, divided into two fractions: a light fraction, known as cold condensate, and a heavy fraction, known as waxes.

These synthetic hydrocarbons produced cannot be directly incorporated in conventional fuel pools or used as lubricants. By way of example, the pour point of a paraffin comprising 20 carbon atoms and having a boiling point at 340° C. is approximately 37° C., which makes its direct incorporation in the gas oil cut impossible due to the required specification of −15° C. A hydroisomerization step is necessary in order to lower the pour points of the different hydrocarbon compounds. Moreover, treatment steps are necessary in order to remove the olefinic and oxygen-comprising compounds, to increase the yield of middle distillates and to improve the properties of the kerosene and gas oil cuts in order to observe the specifications.

Patent Application WO 2010/015737 describes a process for producing middle distillates from a paraffinic feedstock produced by Fischer-Tropsch synthesis using a hydrocracking/hydroisomerization catalyst containing a zeolite IZM-2 and a metal from Group VIB or VIII. The application describes various schemes for using this catalyst. In all the schemes proposed by the inventor, the cut, of which the initial boiling point is less than a temperature of between 120° C. and 200° C., preferably between 130 and 180° C. and even more preferably than a temperature of approximately 150° C., is not subjected to any treatment, whether said treatment is hydrotreatment, hydrocracking and/or hydroisomerization. In other words, the fraction in which the compounds boil at a temperature of less than 150° C. (150° C.−fraction) is not treated in a step using the catalyst comprising the zeolite IZM-2.

The catalyst containing a zeolite IZM-2 is only used in steps treating the heavy fraction, of which the initial boiling point is greater than a temperature of between 300° C. and 410° C. (that is to say the 370° C.+heavy fraction in embodiments 1 and 3), all of the fraction of which the initial boiling point is greater than a temperature of between 120° C. and 200° C. (that is to say the 150° C.+ fraction in embodiment 2) or all of the paraffinic effluent resulting from the Fischer-Tropsch process that is unfractionated in embodiments 4 and 5.

Moreover, embodiments 1 and 3 also describe the fractionation of an intermediate fraction comprising the compounds of which the boiling points are between the cut point between 120 and 200° C., preferably between 130 and 180° C. and even more preferably the cut point of approximately 150° C., and a temperature greater than 300° C., even more preferably greater than 350° C. and less than 410° C. or better still than 370° C. This intermediate fraction corresponding to a middle distillate cut (150-370° C.) is itself treated in a hydroisomerization step in the presence of a catalyst comprising noble metals (Pt and/or Pd) that are active in their reduced form, or using non-noble metals from Group VI (particularly molybdenum and tungsten) in combination with non-noble metals from Group VIII (particularly nickel and cobalt), preferably used in their sulfided form, and a hydroisomerizing function provided by acidic solids, of the type zeolites, halogenated aluminas, pillared clays, heteropolyacids or sulfated zirconia, and preferably one-dimensional 10 MR zeolite molecular sieves chosen from the zeolite molecular sieves of structural type TON (chosen from ZSM-22 and NU-10, taken alone or as a mixture), FER (chosen from ZSM-35 and ferrierite, taken alone or as a mixture), EUO (chosen from EU-1 and ZSM-50, taken alone or as a mixture), SAPO-11 or the zeolite ZBM-30 or ZSM-48 molecular sieves, taken alone or as a mixture.

The research studies carried out by the applicant have led it to discover that, surprisingly, the treatment of at least one portion (that is to say the portion corresponding to the middle distillates) or of all of the cold condensates light fraction resulting from the Fischer-Tropsch process, having an initial boiling point T1 of between 15 and 40° C. and a final boiling point T2 of between 350° C. and 400° C. (that is to say the 370° C.−fraction), as a mixture with at least one portion of the light fraction of the waxes derived from the FT process, on a catalyst comprising at least one noble metal from Group VIII and a zeolite IZM-2, makes it possible to maximize the yields of middle distillates cut corresponding to the specifications by reducing the energy consumption, and in particular to limit the production of light cracked products that cannot be incorporated in a petrol pool.

In one variant of the invention, it is the fraction corresponding to the middle distillates of the cold condensates fraction resulting from the Fischer-Tropsch process which is treated, as a mixture with at least one portion of the light fraction of the waxes resulting from the Fischer-Tropsch process on the IZM-2-based catalyst.

One objective of the present invention is thus to provide a process for the production of middle distillates from a paraffinic effluent produced by Fischer-Tropsch synthesis in which a judicious sequence of steps makes possible the treatment of at least one portion of the cold condensate light fraction of said paraffinic effluent, as a mixture with at least one portion of the light fraction of the waxes resulting from the Fischer-Tropsch synthesis, in a step of hydroisomerization in the presence of an IZM-2-based catalyst that is very selective for hydroisomerization, making it possible simultaneously to maximize the production of middle distillates and to limit the production of light cracked products which cannot be incorporated in a petrol pool and thus to improve the selectivity with regard to the production of middle distillates, kerosene and/or gas oil.

SUBJECT OF THE INVENTION

The present invention relates to a process for producing middle distillates from a paraffinic feedstock produced by Fischer-Tropsch synthesis and divided into two fractions, a light fraction, known as cold condensate, and a heavy fraction, known as waxes, comprising at least the following steps:

a) fractionation of said heavy fraction, known as waxes, so as to obtain a light fraction, the final boiling point of which is between 350° C. and 400° C. and preferably between 360° C. and 380° C., and a heavy fraction which boils above said light fraction, b) mixing of said light fraction, the final boiling point of which is between 350° C. and 400° C. and preferably between 360° C. and 380° C., and preferably less than 370° C., derived from step a) with at least one portion of said cold condensate fraction, c) hydrotreatment of the mixture derived from step b) in the presence of a hydrotreatment catalyst and which operates at a temperature of between 250 and 450° C., at a pressure of between 0.5 and 15 MPa, at a hydrogen flow rate adjusted in order to obtain a ratio of between 100 and 3000 standard litres per litre, and at an hourly space velocity of between 0.1 and 40 $h^{-1}$, d) hydroisomerization of at least one portion of the effluent derived from step c) in the presence of a catalyst comprising at least one noble metal from Group VIII of the Periodic Table and at least one zeolite IZM-2, step d) operating at a temperature of between 200 and 450° C., a pressure of between 1 and 15 MPa, a space velocity of between 0.1 and 10 $h^{-1}$ and a hydrogen flow rate adjusted in order to obtain a ratio of between 100 and 2000 standard litres of hydrogen per litre of feedstock, e) hydrocracking and hydroisomerization of at least one portion and preferably all of the heavy fraction derived from step a) in the presence of a hydrocracking catalyst and operating at a temperature of between 250° C. and 450° C., at a pressure of between 0.2 and 15 MPa, at a space velocity of between 0.1 $h^{-1}$ and 10 $h^{-1}$, and at a hydrogen flow rate adjusted in order to obtain a ratio of between 100 and 2000 standard litres of hydrogen per litre of feedstock, f) fractionation of the mixture of the effluent derived from step e) and the effluent derived from step d) so as to obtain at least one petrol fraction and at least one middle distillates fraction.

One advantage of the present invention is thus that of providing a process for producing middle distillates from a paraffinic effluent produced by Fischer-Tropsch synthesis in which a judicious sequence of steps makes possible the treatment either of all of the cold condensate light fraction of said paraffinic effluent, or of the fraction corresponding to the middle distillates of said cold condensate fraction, as a mixture with at least one portion of the light fraction of the waxes resulting from the Fischer-Tropsch process, in a step of hydroisomerization in the presence of an IZM-2-based catalyst that is very selective for hydroisomerization, making it possible simultaneously to maximize the production of middle distillates and to limit the production of light cracked products which cannot be incorporated in a petrol pool and thus to improve the selectivity with regard to the production of middle distillates.

DETAILED DESCRIPTION OF THE INVENTION

In accordance with the invention, the present invention relates to a process for producing middle distillates from a paraffinic feedstock produced by Fischer-Tropsch synthesis and divided into two fractions, a light fraction, known as cold condensate, and a heavy fraction, known as waxes.

The Fischer-Tropsch process, which is well known to those skilled in the art, makes it possible to produce synthetic hydrocarbons from a gaseous feedstock predominantly composed of hydrogen and of carbon monoxide, also known as synthesis gas ($CO+H_2$).

The synthesis gas ($CO+H_2$) feeding the Fischer-Tropsch process can advantageously be produced from natural gas, from coal, from biomass, from any source of hydrocarbon compounds or from a mixture of these sources.

In particular, in the low-temperature Fischer-Tropsch process, the synthesis gas ($CO+H_2$) is converted catalytically into water, oxygen-comprising products and olefins and into essentially linear paraffins, also known as n-paraffins, in the gas, liquid or solid form under standard conditions. After separation of the water, the synthetic hydrocarbons obtained are predominantly composed of paraffins but also contain olefins and oxygen-comprising products.

Preferably, the effluent resulting from the Fischer-Tropsch process comprises a content of n-paraffins of greater than 70% by weight and more preferably still of greater than 80% by weight, relative to the total weight of said feedstock.

Preferably, the paraffinic effluent resulting from the Fischer-Tropsch process is free of heteroatomic impurities, such as, for example, sulfur, nitrogen or metals.

In accordance with the invention, the paraffinic effluent resulting from the Fischer-Tropsch process is, at the outlet of the Fischer-Tropsch synthesis unit, divided into two fractions: a light fraction, known as cold condensate, and a heavy fraction, known as waxes.

The light fraction, known as cold condensate, corresponds to the hydrocarbons in the gas state under the conditions of the Fischer-Tropsch reaction and the heavy fraction, known as waxes, corresponds to the hydrocarbons in the liquid state under the conditions of the Fischer-Tropsch reaction.

The cold condensates light fraction exhibits an initial boiling point T1 of between 15 and 40° C. and preferably between 20 and 35° C. and a final boiling point T2 of between 350° C. and 400° C. and preferably between 360° C. and 380° C. and preferably of less than 370° C.

The waxes heavy fraction advantageously exhibits an initial boiling point T2 of between 100 and 300° C. and preferably between 125 and 200° C., said heavy fraction preferably corresponding to a paraffinic fraction having a number of carbon atoms of greater than 8.

This heavy fraction has the distinguishing feature, due to its composition, formed essentially of n-paraffins having a high number of carbon atoms which can range up to more than 150, of being solid at ambient temperature.

In the light fraction, the content of paraffins is greater than 70% by weight, relative to the total weight of said light fraction, the content of olefins is less than 20% by weight and the content of oxygen-comprising compounds is less than 10% by weight, the contents being expressed as percentage by weight relative to the total weight of said light fraction. In the heavy fraction, the content of paraffins is greater than 80% by weight, the content of olefins is less than 15% by weight and the content of oxygen-comprising compounds is less than 5% by weight, the contents being expressed as percentage by weight relative to the total weight of said heavy fraction.

Step a)

According to the invention, the process comprises a step a) of fractionation of said heavy fraction, known as waxes, so as to obtain a light fraction, the final boiling point of which is between 350° C. and 400° C. and preferably between 360° C. and 380° C. and preferably less than 370° C., and a heavy fraction which boils above said light fraction.

The fractionation is advantageously carried out according to any of the methods known to those skilled in the art, such as, for example, flash distillation, or distillation.

Step b)

According to the invention, the process comprises a step of mixing said light fraction of the waxes, the final boiling point of which is between 350° C. and 400° C. and preferably between 360° C. and 380° C., resulting from step a), with at least one portion of said cold condensate fraction.

According to a first variant, said light fraction of the waxes, separated in step a), is mixed with all of said cold condensate fraction.

According to a second variant, the process comprises a step a') of fractionation of the cold condensate fraction so as to obtain a light fraction of said cold condensate fraction, the final boiling point of which is between 120 and 200° C., preferably between 130 and 180° C. and more preferably less than 150° C., and a heavy fraction which boils above said light fraction, having an initial boiling point of between 80 and 200° C., preferably between 100 and 180° C. and more preferably greater than 120° C.

Said heavy fraction separated in step a') corresponds to a fraction which boils in the middle distillate temperature range (120° C.+).

Said fractionation step a') thus enables the separation of a fraction which boils in the middle distillate temperature range and thus enables the treatment of this fraction corresponding to the middle distillates in the hydrotreatment step c), then in the hydroisomerization step d) in the presence of the IZM-2-based catalyst as a mixture with the light fraction of the waxes separated in step a).

The fractionation is advantageously carried out according to any of the methods known to those skilled in the art, such as, for example, flash distillation, or distillation.

According to this second variant, said light fraction of said cold condensate fraction separated in said step a') is sent to an optional hydrotreatment step c'). Said hydrotreatment step c') is advantageously carried out under the conventional hydrotreatment conditions and in the presence of a conventional hydrotreatment catalyst allowing the elimination of the oxygen-comprising compounds and the hydrogenation of the olefins. Preferably, said hydrotreatment step c') is carried out at a temperature of between 150 and 430° C. and preferably between 150 and 400° C. and preferably between 150 and 380° C., at a pressure of between 0.5 and 15 MPa and preferably between 1 and 9 MPa, at a hydrogen flow rate adjusted in order to obtain a ratio of between 100 and 3000 standard litres per litre, preferably between 250 and 2000 standard litres per litre and preferably between 150 and 1500 standard litres per litre, and at an hourly space velocity of between 0.2 and 20 $h^{-1}$, preferably between 0.2 and 10 $h^{-1}$ and preferably between 0.2 and 5 $h^{-1}$.

The hydrotreatment catalyst used in step c') will be described in step c). It may advantageously be identical to or different from the one used in said step c) according to the invention.

The effluent resulting from said step c') is then advantageously mixed with the petrol effluent resulting from the fractionation step f) according to the invention.

According to this same variant, said heavy fraction of said cold condensate fraction separated in said step a') is advantageously mixed in step b) according to the invention with said light fraction of the waxes, the final boiling point of which is between 350° C. and 400° C. and preferably between 360° C. and 380° C., resulting from step a).

According to this second variant, the feedstock of the hydrotreatment step c) comprises and preferably consists of said heavy fraction of said cold condensate fraction separated in said step a') as a mixture with said light fraction of the waxes, the final boiling point of which is between 350° C. and 400° C. and preferably between 360° C. and 380° C., resulting from step a).

Step c)

According to the invention, the process comprises a step of hydrotreatment of the mixture derived from step b) in the presence of a hydrotreatment catalyst and which operates at a temperature of between 250 and 450° C., at a pressure of between 0.5 and 15 MPa, at a hydrogen flow rate adjusted in order to obtain a ratio of between 100 and 3000 standard litres per litre, and at an hourly space velocity of between 0.1 and 40 $h^{-1}$.

Preferably, said hydrotreatment step c) is carried out at a temperature of between 280 and 420° C. and preferably between 330 and 390° C., at a pressure of between 0.5 and 0.7 MPa, at a hydrogen flow rate adjusted in order to obtain a ratio of between 250 and 2000 standard litres per litre and preferably between 500 and 1500 standard litres per litre, and at an hourly space velocity of between 0.25 and 20 $h^{-1}$ and preferably between 0.5 and 10 $h^{-1}$.

Said hydrotreatment step makes it possible to reduce the content of olefinic and unsaturated compounds and also to optionally decompose the oxygen-comprising compounds present in the fraction.

The hydrotreatment catalyst used in step c) is a conventional hydrotreatment catalyst. Said catalyst comprises at least one metal from Group VIII and/or from Group VI of the Periodic Table of the Elements. Preferably, the catalyst comprises at least one metal from the group of metals formed by nickel, molybdenum, tungsten, cobalt, ruthenium, indium, palladium and platinum, alone or as a mixture, and comprises at least one support chosen from aluminas, boron oxides, magnesia, zirconia, titanium oxides and clays or a combination of these oxides; preferably, said support is an alumina. Said catalysts can advantageously be prepared by any method known to those skilled in the art or else can be acquired from companies which are specialists in the manufacture and the sale of catalysts.

In the case of the use of non-noble metals from Group VIII, a combination of at least one metal from Group VI, preferably molybdenum or tungsten, and of at least one metal from Group VIII, preferably cobalt and nickel, of the Periodic Table of the Elements is advantageously used. The concentration of non-noble metal from Group VIII, when the latter is used, is advantageously from 0.01% to 15% by weight of oxide equivalent, relative to the finished catalyst, and that of the metal from Group VI is advantageously from 5% to 40% by weight of oxide equivalent, relative to the finished catalyst. When a combination of metals from Group VI and from Group VIII is used, the catalyst is then preferably used in a reduced or sulfided form.

Under these conditions, the content of unsaturated and oxygen-comprising molecules in the effluent resulting from said step c) is reduced to less than 0.5% by weight and to approximately less than 0.1% by weight in general. The hydrotreatment step is carried out under conditions such that the conversion of products having boiling points of greater than or equal to 370° C. into products having boiling points of less than 370° C. is limited to 20% by weight, preferably is less than 10% by weight and even more preferably is less than 5% by weight.

The effluent resulting from step c) can advantageously be sent to a step of removal of at least a portion of the water formed during said step c) and preferably of all of the water formed, before being sent to the hydroisomerization step d) according to the invention.

Said step of removal of at least a portion of the water can advantageously be carried out by any method and technique known to those skilled in the art, for example by drying, passing over a desiccant, flash distillation or separation by settling.

Step d)

According to the invention, the process comprises a step d) of hydroisomerization of at least one portion or of all of the effluent resulting from step c) in the presence of a hydroisomerization catalyst comprising at least one noble metal from Group VIII of the Periodic Table and a support comprising and preferably consisting of at least one zeolite IZM-2 and at least one binder, step d) operating at a temperature of between 200 and 450° C., a pressure of between 1 and 15 MPa, a space velocity of between 0.1 and 10 $h^{-1}$ and a hydrogen flow rate adjusted in order to obtain a ratio of between 100 and 2000 standard litres of hydrogen per litre of feedstock.

Preferably, said hydroisomerization step d) operates at a temperature of between 250° C. and 450° C. and preferably between 300° C. and 450° C., a pressure of between 1 and 10 MPa and preferably of between 1 and 9 MPa, a space velocity of between 0.2 and 7 $h^{-1}$ and preferably between 0.5 and 5 $h^{-1}$, and a hydrogen flow rate adjusted in order to obtain a ratio of between 150 and 2000 standard litres of hydrogen per litre of feedstock and preferably between 150 and 1500 standard litres of hydrogen per litre of feedstock.

According to a first variant, all of the effluent resulting from step c), having optionally undergone a step of removal of at least one portion of the water, is sent to the hydroisomerization step d).

According to a second variant, the process comprises a step a") of fractionation of the effluent resulting from the hydrotreatment step c) so as to obtain a light fraction of said effluent, the final boiling point of which is between 120 and 200° C., preferably between 130 and 180° C. and more preferably less than 150° C., and a heavy fraction which boils above said light fraction, having an initial boiling point of between 80 and 200° C., preferably between 100 and 180° C. and preferably greater than 120° C., and a final boiling point of between 350° C. and 400° C., preferably between 360° C. and 380° C. and preferably less than 370° C.

The fractionation is advantageously carried out according to any of the methods known to those skilled in the art, such as, for example, flash distillation, or distillation.

Said light fraction of said effluent, the final boiling point of which is between 120 and 200° C., preferably between 130 and 180° C. and more preferably less than 150° C., separated in step a"), is then advantageously mixed with the petrol effluent resulting from the fractionation step f) according to the invention, in order to be sent to petrochemistry.

Said heavy fraction separated in step a") corresponds to a fraction which boils in the middle distillate temperature range (120-370° C.).

Said heavy fraction separated in step a") is then advantageously sent to said hydroisomerization step d) according to the invention.

Said fractionation step a") thus enables the separation of a fraction which boils in the middle distillate temperature range and thus enables the treatment of this middle distillate fraction in step d) of hydroisomerization in the presence of the IZM-2-based catalyst.

According to this second variant, the feedstock of the hydroisomerization step d) comprises and preferably consists of said heavy fraction separated in step a").

According to the invention, the catalyst used in the hydroisomerization step d) comprises and preferably consists of at least one noble metal from Group VIII of the Periodic Table and a support comprising and preferably consisting of at least one zeolite IZM-2 and at least one binder.

The catalyst used in the process according to the invention is advantageously of bifunctional type, that is to say that it has a hydro/dehydrogenating function and a hydroisomerizing function.

Preferably, the noble metal from Group VIII is chosen from ruthenium, rhodium, palladium, osmium, iridium or platinum, taken alone or as a mixture, and preferably from platinum and palladium, taken alone or as a mixture.

Said metal(s) are advantageously used in their reduced form.

Preferably, the content of noble metal of said catalyst is advantageously between 0.01% and 5% by weight, preferably between 0.1% and 4% by weight and very preferably between 0.1% and 2% by weight, relative to the total weight of said catalyst.

According to a preferred form, said catalyst can also comprise tin in addition to said noble metal(s), the content of tin preferably being between 0.1% and 0.5% by weight, relative to the total weight of catalyst.

The zeolite IZM-2 used in the catalyst of step d) is a crystalline microporous solid exhibiting a crystalline structure described in Patent Application FR 2 918 050. The process for the preparation of the zeolite IZM-2 is also described in said patent application.

Said solid IZM-2 exhibits a chemical composition, expressed on an anhydrous basis, in terms of moles of oxides, defined by the following general formula: $XO_2$:$aY_2O_3$:$bM_{2/n}O$, in which X represents at least one tetravalent element, Y represents at least one trivalent element and M is at least one alkali metal and/or one alkaline earth metal of valency n.

X is preferably chosen from silicon, germanium, titanium and the mixture of at least two of these tetravalent elements; very preferably, X is silicon; and Y is preferably chosen from aluminium, boron, iron, indium and gallium; very preferably, Y is aluminium. M is preferably chosen from lithium, sodium, potassium, calcium, magnesium and the mixture of at least two of these metals, and very preferably M is sodium. Preferably, X represents silicon; the crystalline solid IZM-2 according to the invention is then an entirely silicic solid when the element Y is absent from the composition of said solid IZM-2. It is also advantageous to employ, as element X, a mixture of several elements X, in particular a mixture of silicon with another element X chosen from germanium and titanium, preferably germanium. Thus, when silicon is present as a mixture with another element X, the crystalline solid IZM-2 according to the invention is then a crystalline metallosilicate exhibiting an X-ray diffraction diagram identical to that described in Table 1 when it is in its calcined form. More preferably still and in the presence of an element Y, X being silicon and Y being aluminium: the crystalline solid IZM-2 according to the invention is then an aluminosilicate.

Preferably, the zeolite IZM-2 is in aluminosilicate form.

Preferably, the molar ratio of the number of silicon atoms to the number of aluminium atoms Si/Al is less than 200, preferably less than 150 and very preferably less than 120.

The zeolite IZM-2 participating in the composition of the support of the catalyst according to the invention is advantageously exchanged via at least one treatment with a solution of at least one ammonium salt so as to obtain the ammonium form of the zeolite IZM-2, which, once calcined, results in the acid (H$^+$) form of said zeolite IZM-2. This exchange step can be carried out at any step of the preparation of the catalyst, that is to say after the step of preparation of the zeolite IZM-2, after the step of shaping the zeolite IZM-2 with a porous inorganic binder, or indeed after the step of introduction of the hydro/dehydrogenating metal. Preferably, the exchange step is carried out after the step of shaping the zeolite IZM-2.

Said zeolite IZM-2 participating in the composition of the support of the catalyst used in the process according to the invention is advantageously at least partially, preferably virtually completely, in the acid form, that is to say in the acid (H$^+$) form.

Preferably, said catalyst of step d) comprises from 2% to 80% by weight of zeolite IZM-2, very preferably from 5% to 50% by weight and more preferably from 5% to 30% by weight, relative to the total weight of said catalyst.

According to the invention, the support of the catalyst used in the process according to the invention contains a binder. Said binder can advantageously be amorphous or crystalline. Preferably, said binder is advantageously chosen from the group formed by alumina, silica, silica/alumina, clays, titanium oxide, boron oxide and zirconia, taken alone or as a mixture. Aluminates can also be chosen.

Preferably, said binder of the support is alumina. Preferably, said binder of the support is a matrix containing alumina in all its forms known to those skilled in the art, such as, for example, aluminas of α, γ, η or δ type. Said aluminas differ in their specific surface area and their pore volume. Said binder of the support is preferably provided in the form of beads, grains or extrudates.

Preferably, said catalyst comprises from 5% to 98% by weight of binder, very preferably from 10% to 95% by weight and more preferably from 20% to 95% by weight, relative to the total weight of said catalyst.

The support of the catalyst used in step d) according to the invention can advantageously be prepared according to any method well known to those skilled in the art.

According to a preferred method of preparation, said crystalline zeolite IZM-2 can advantageously be introduced during the dissolution or suspending of the alumina compounds advantageously used according to the invention. Said crystalline zeolite IZM-2 can, without this being limiting, for example be in the form of a powder, ground powder, suspension or suspension which has undergone a deagglomeration treatment. Thus, for example, said crystalline zeolite can advantageously be placed in acidified or non-acidified suspension at a concentration adjusted to the final content of solid IZM-2 targeted in the catalyst used according to the present invention. This suspension, commonly known as a slip, is then mixed with the alumina compounds.

The support of the catalyst used in step d) according to the invention can advantageously be shaped via any technique known to those skilled in the art. The shaping can advantageously be carried out, for example, by extrusion, by pelleting, by the oil drop method, by rotating plate granulation or by any other method well known to those skilled in the art.

The shaping can also advantageously be carried out in the presence of the different constituents of the catalyst and extrusion of the inorganic paste obtained, by pelleting, shaping in the form of beads with a rotary coating device or with a drum, drop coagulation, oil drop, oil up or any other known process for the agglomeration of a powder containing alumina and optionally other ingredients chosen from those mentioned above.

Furthermore, the supports employed in the process according to the present invention can advantageously have been treated, as is well known to those skilled in the art, with additives in order to facilitate the shaping and/or to improve the final mechanical properties of the supports. Mention may in particular be made, as examples of additives, of cellulose, carboxymethylcellulose, carboxyethylcellulose, tall oil, xanthan gums, surface-active agents, flocculating agents, such as polyacrylamides, carbon black, starches, stearic acid, polyacrylic alcohol, polyvinyl alcohol, biopolymers, glucose, polyethylene glycols, and the like.

The extrusion can advantageously be carried out by any conventional commercially available tool. The paste resulting from the kneading is advantageously extruded through a die, for example using a piston, a single extruding screw or twin extruding screws. This extrusion step can advantageously be carried out by any method known to those skilled in the art.

The support of the catalyst employed in step d) according to the present invention is subsequently advantageously subjected to a drying step carried out according to any technique known to those skilled in the art.

Preferably, the drying is carried out under a stream of air. Said drying can also advantageously be carried out under a stream of any oxidizing, reducing or inert gas. Preferably, the drying is advantageously carried out between 50 and 180° C., preferably between 60 and 150° C. and very preferably between 80 and 130° C.

Said support, optionally dried, is subsequently preferably subjected to a calcination step.

Said calcination step is advantageously carried out in the presence of molecular oxygen, for example by flushing with air, at a temperature advantageously of greater than 200° C. and less than or equal to 1100° C. Said calcination step can advantageously be carried out in a traversed bed, in a swept bed or under a static atmosphere. For example, the oven used can be a rotary oven or can be a vertical oven comprising radial traversed layers. Preferably, said calcination step is carried out for between more than one hour at 200° C. and less than one hour at 1100° C. The calcination can advantageously be carried out in the presence of steam and/or in the presence of an acidic or basic vapour. For example, the calcination can be carried out under a partial pressure of ammonia.

Post-calcination treatments can optionally be carried out, so as to improve the properties, for example the textural properties, of the support.

The IZM-2/binder support of the catalyst employed in step d) according to the present invention can thus optionally be subjected to a hydrothermal treatment in a confined atmosphere. The term "hydrothermal treatment in a confined atmosphere" is understood to mean a treatment by passing to an autoclave in the presence of water at a temperature greater than ambient temperature.

During this hydrothermal treatment, the support can advantageously be treated. Thus, the support can advantageously be impregnated, prior to its treatment in the autoclave, the autoclaving being performed either in the vapour phase or in the liquid phase, it being possible for this vapour or liquid phase of the autoclave to be acidic or non-acidic. This impregnation, prior to the autoclaving, can advantageously be acidic or non-acidic. This impregnation, prior to the autoclaving, can advantageously be carried out dry or by immersion of the support in an acidic aqueous solution. The term "dry impregnation" is intended to mean bringing the support into contact with a volume of solution less than or equal to the total pore volume of the support. Preferably, the impregnation is carried out dry.

The autoclave is preferably a rotating basket autoclave, such as that defined in Patent Application EP-A-0 387 109.

The temperature during the autoclaving can be between 100 and 250° C. for a period of time of between 30 minutes and 3 hours.

The hydro/dehydrogenating function can advantageously be introduced at any step of the preparation, very preferably after shaping said IZM-2/binder support. The shaping is advantageously followed by a calcination; the hydro/dehydrogenating function can also advantageously be introduced before or after this calcination. The preparation is generally terminated by a calcination at a temperature of 250 to 600° C. Another of the preferred methods according to the present invention advantageously consists in shaping the IZM-2/ binder support after a kneading of the latter and then passing the paste thus obtained through a die in order to form extrudates. The hydro/dehydrogenating function can advantageously be then introduced, in part only or in its entirety, at the time of the kneading. It can also advantageously be introduced by one or more ion-exchange operations on the calcined support.

Preferably, the support is impregnated with an aqueous solution. The impregnation of the support is preferably carried out by the "dry" impregnation method well known to those skilled in the art. The impregnation may advantageously be performed in a single step with a solution containing all of the constituent elements of the final catalyst.

The hydro/dehydrogenating function can advantageously be introduced by one or more operations of impregnation of the shaped and calcined support with a solution containing at least one precursor of at least one oxide of at least one metal chosen from the group among the noble metals of Group VIII.

The noble metals of Group VIII of the catalyst of the present invention can advantageously be present completely or partially in the metallic and/or oxide form.

The sources of noble elements of Group VIII which can advantageously be used are well known to those skilled in the art. For the noble metals, halides, for example chlorides, nitrates, acids, such as chloroplatinic acid, hydroxides or oxychlorides, such as ammoniated ruthenium oxychloride, are used. Use may also advantageously be made of cationic complexes, such as ammonium salts, when it is desired to deposit platinum on the solid IZM-2 by cation exchange.

The catalysts thus obtained are shaped in the form of grains with different shapes and dimensions. They are generally used in the form of cylindrical extrudates or polylobal extrudates, such as bilobal, trilobal or polylobal extrudates, of straight or twisted form, but can optionally be manufactured and employed in the form of crushed powders, lozenges, rings, beads or wheels. Techniques other than extrusion, such as pelleting or coating, can advantageously be used.

Preferably, the catalysts employed in the process according to the invention are in the form of spheres or of extrudates. However, it is advantageous for the catalyst to be in the form of extrudates with a diameter of between 0.5 and 5 mm and more particularly between 0.7 and 2.5 mm. The shapes are cylindrical (which may or may not be hollow), twisted cylindrical, multilobal (for example 2, 3, 4 or 5 lobes) or annular. The cylindrical shape is advantageously preferably used but any other shape can advantageously be used.

The noble metal present in said catalyst is advantageously in the reduced form. The reduction of the metal is advantageously carried out by treatment under hydrogen at a temperature of between 150° C. and 650° C. and a total pressure of between 0.1 and 25 MPa. For example, a reduction consists of a stationary phase at 150° C. for two hours, then a rise in temperature up to 450° C. at the rate of 1° C./min and then a stationary phase of two hours at 450° C.; throughout this reduction step, the hydrogen flow rate is 1000 standard $m^3$ of hydrogen per $m^3$ of catalyst and the total pressure is kept constant at 0.1 MPa. Any ex situ reduction method can advantageously be envisaged.

The operating conditions employed in step d) make it possible to obtain an isomerized effluent containing little in the way of or no longer containing olefinic compounds and oxygen-comprising compounds.

The isomerized effluent resulting from step d) is then sent to the fractionation step f) in order to obtain at least one middle distillates fraction.

Step e)

According to the invention, the process comprises a step e) of hydrocracking and hydroisomerization of at least one portion and preferably all of the heavy fraction of the waxes derived from step a) in the presence of a hydrocracking and hydroisomerization catalyst and operating at a temperature of between 250° C. and 450° C., at a pressure of between 0.2 and 15 MPa, at a space velocity of between 0.1 $h^{-1}$ and 10 $h^{-1}$, and at a hydrogen flow rate adjusted in order to obtain a ratio of between 100 and 2000 standard litres of hydrogen per litre of feedstock.

Preferably, step e) operates at a temperature of between 280 and 450° C. and more preferably still between 320 and 420° C., at a pressure of between 0.5 and 10 MPa, more preferably between 1 and 9 MPa and very preferably between 2 and 8 MPa, at a space velocity of between 0.2 and 7 $h^{-1}$ and more preferably between 0.5 and 5 $h^{-1}$, and at a hydrogen flow rate adjusted in order to obtain a ratio of between 150 and 1500 standard litres of hydrogen per litre of feedstock and more preferably between 300 and 1500 standard litres of hydrogen per litre of feedstock.

The heavy fraction of the Fischer-Tropsch waxes constituting the feedstock of step e) is a fraction which boils above the light fraction resulting from the separation step a) and advantageously has an initial boiling point of between 350° C. and 400° C., preferably between 360° C. and 380° C. and preferably greater than 370° C.

Said heavy fraction comprises little in the way of olefins and little in the way of oxygen-comprising compounds, these compounds mainly being present in the light cuts produced by the Fischer-Tropsch synthesis.

The process according to the invention may optionally comprise a step c") of hydrotreatment of said heavy fraction resulting from step a), prior to said hydrocracking and hydroisomerization step e).

In the case where it is carried out, the hydrotreatment step c") is advantageously carried out under operating and catalytic conditions identical to those used for steps c) and c') of the process according to the invention.

The hydrotreatment catalyst used in step c") can advantageously be identical to or different from those used in steps c) and c') according to the invention.

The heavy fraction of the Fischer-Tropsch waxes resulting from step a) according to the invention, having optionally undergone a hydrotreatment step c"), can advantageously be sent to a step of removal of at least one portion and preferably all of the water, before being sent to the hydrocracking and hydroisomerization step e) according to the invention.

Said step of removal of at least a portion of the water can advantageously be carried out by any method and technique known to those skilled in the art, for example by drying, passing over a desiccant, flash distillation or separation by settling.

The hydrocracking and hydroisomerization catalyst employed during step e) advantageously comprises at least one hydro/dehydrogenating metal chosen from the group formed by the metals of Group VIb and of Group VIII of the Periodic Table and at least one Bronsted acid solid, that is to say a solid which can release one or more protons, and optionally a binder.

Preferably, said hydrocracking and hydroisomerization catalyst comprises either at least one noble metal from Group VIII chosen from platinum and palladium, taken alone or as a mixture, which are active in their reduced form, or at least one non-noble metal from Group VIII chosen from nickel and cobalt in combination with at least one metal from Group VIb chosen from molybdenum and tungsten, taken alone or as a mixture, and preferably used in their sulfided form.

Preferably, said hydrocracking and hydroisomerization catalyst comprises at least one noble metal from Group VIII chosen from platinum and palladium, taken alone or as a mixture, and preferably platinum, which is/are active in its/their reduced form.

In the case where said hydrocracking and hydroisomerization catalyst comprises at least one noble metal from Group VIII, the content of noble metal of said catalyst is advantageously between 0.01% and 5% by weight, relative to the finished catalyst, preferably between 0.05% and 4% by weight and very preferably between 0.10% and 2% by weight.

In the case where said hydrocracking and hydroisomerization catalyst comprises at least one metal from Group VIb in combination with at least one non-noble metal from Group VIII chosen from nickel and cobalt, the content of metal from Group VIb of said catalyst is advantageously, as oxide equivalent, between 5% and 40% by weight, relative to the finished catalyst, preferably between 10% and 35% by weight, and the content of metal from Group VIII of said catalyst is advantageously, as oxide equivalent, between 0.5% and 10% by weight, relative to the finished catalyst, preferably between 1% and 8% by weight and very preferably between 1.5% and 6% by weight.

The metal function is advantageously introduced onto the catalyst by any method known to those skilled in the art, such as, for example, cokneading, dry impregnation or impregnation by exchange.

Advantageously, the Bronsted acid solid comprises and preferably consists of silica/alumina or zeolite Y.

Optionally, a binder can also be used during the step of shaping the support. A binder is preferably used when the zeolite is employed. Said binder is advantageously chosen from silica ($SiO_2$), alumina ($Al_2O_3$), clays, titanium oxide ($TiO_2$), boron oxide ($B_2O_3$) and zirconia ($ZrO_2$), taken alone or as a mixture. Preferably, said binder is chosen from silica and alumina and more preferably still said binder is alumina in all its forms known to those skilled in art, such as, for example, γ-alumina.

A preferred hydrocracking and hydroisomerization catalyst according to the invention advantageously comprises at least one noble metal, said noble metal being platinum, and a Bronsted acid solid of silica/alumina type, without any binder. The silica content of the silica/alumina, expressed as percentage by weight, is generally between 1% and 95%, advantageously between 5% and 95%, preferably between 10% and 80% and more preferably still between 20% and 70% and between 22% and 45%. This silica content is perfectly measured using X-ray fluorescence.

Several preferred catalysts used in the hydrocracking and hydroisomerization step b) of the process according to the invention are described below.

A preferred hydrocracking and hydroisomerization catalyst used in the process according to the invention comprises a specific silica/alumina. Preferably, said catalyst comprises from 0.05% to 10% by weight, preferably between 0.1% and 5% by weight, of at least one noble metal from Group VIII, preferably chosen from platinum and palladium (in a preferred way platinum), deposited on a silica/alumina support, without any binder, containing an amount of silica ($SiO_2$) of between 1% and 95%, expressed as percentage by weight, preferably between 5% and 95%, in a preferred way between 10% and 80%, in a very preferred way between 20% and 70% and in an even more preferred way between 22% and 45%, said catalyst exhibiting:

a BET specific surface area of 100 $m^2/g$ to 500 $m^2/g$, preferably of between 200 $m^2/g$ and 450 $m^2/g$ and very preferably between 250 $m^2/g$ and 450 $m^2/g$, a mean diameter of the mesopores of between 3 nm and 12 nm, preferably of between 3 nm and 11 nm and very preferably between 4 nm and 10.5 nm, a pore volume of the pores, the diameter of which is between the mean diameter as defined above, decreased by 3 nm, and the mean diameter as defined above, increased by 3 nm, which is greater than 40% of the total pore volume, preferably of between 50% and 90% of the total pore volume and very preferably of between 50% and 70% of the total pore volume, a total pore volume of between 0.4 and 1.2 ml/g, preferably between 0.5 and 1.0 ml/g and very preferably between 0.5 and 0.9 ml/g, a content of alkali metal or alkaline earth metal compounds of less than 300 ppm by weight and preferably of less than 200 ppm by weight.

The mean diameter of the mesopores is defined as being the diameter corresponding to the cancellation of the curve derived from the mercury intrusion volume obtained from the mercury porosity curve for pore diameters of between 2 and 50 m. The mean diameter of the mesopores of the catalyst is advantageously measured from the pore distribution profile obtained using a mercury porosimeter.

Preferably, the dispersion of the metal of said preferred catalyst is advantageously between 20% and 100%, preferably between 30% and 100% and very preferably between 40% and 100%. The dispersion, representing the fraction of metal accessible to the reactant relative to the total amount of metal of the catalyst, is advantageously measured, for example, by $H_2/O_2$ titration or by transmission electron microscopy.

Preferably, the coefficient of distribution of the noble metal of said preferred catalyst is greater than 0.1, preferably greater than 0.2 and very preferably greater than 0.4. The distribution of the noble metal represents the distribution of the metal inside the catalyst grain, it being possible for the metal to be well or poorly dispersed. Thus, it is possible to obtain platinum which is poorly distributed (for example detected in a ring, the thickness of which is markedly less than the radius of the grain) but well dispersed, that is to say that all the platinum atoms, located in the ring, will be accessible to the reactants. The coefficient of distribution of the noble metal can be measured by an electron probe microanalyser.

The noble metal salt is advantageously introduced by one of the normal methods used to deposit the metal at the surface of a solid. One of the preferred methods is dry impregnation, which consists of the introduction of the metal salt in a volume of solution which is equal to the pore volume of the weight of solid to be impregnated. Before the reduction operation, the catalyst can advantageously be subjected to a calcination, such as, for example, a treatment under dry air at a temperature of 300 to 750° C. and preferably at a temperature equal to 520° C., for 0.25 to 10 hours and preferably for 2 hours.

Another preferred hydrocracking and hydroisomerization catalyst used in the process according to the invention comprises at least one hydro/dehydrogenating element chosen from the group formed by the elements from Group VIb and from Group VIII of the Periodic Table, from 0.01% to 5.5% by weight of oxide of a doping element chosen from phosphorus, boron and silicon and a non-zeolite support based on silica/alumina containing an amount of greater than 5% by weight and less than or equal to 95% by weight of silica ($SiO_2$), said catalyst exhibiting the following characteristics:

a mean mesopore diameter, measured by mercury porosimetry, of between 2 and 14 nm,
a total pore volume, measured by mercury porosimetry, of between 0.1 ml/g and 0.5 ml/g,
a total pore volume, measured by nitrogen porosimetry, of between 0.1 ml/g and 0.5 ml/g,
a BET specific surface area of between 100 and 550 m²/g,
a pore volume, measured by mercury porosimetry, contained in the pores with a diameter of greater than 14 nm, of less than 0.1 ml/g,
a pore volume, measured by mercury porosimetry, contained in the pores with a diameter of greater than 16 nm, of less than 0.1 ml/g,
a pore volume, measured by mercury porosimetry, contained in the pores with a diameter of greater than 20 nm, of less than 0.1 ml/g,
a pore volume, measured by mercury porosimetry, contained in the pores with a diameter of greater than 50 nm, of less than 0.1 ml/g,
an X-ray diffraction diagram which contains at least the main lines characteristic of at least one of the transition aluminas included in the group composed of α-, ρ-, χ-, η-, γ-, κ-, θ- and δ-aluminas,
a tapped packing density of greater than 0.7 g/ml.

Another preferred hydrocracking and hydroisomerization catalyst used in the process according to the invention comprises (and preferably is essentially composed of) from 0.05% to 10% by weight and preferably between 0.1% and 5% by weight of at least one noble metal from Group VIII, preferably chosen from platinum and palladium and preferably said noble metal being platinum, deposited on a silica/alumina support, without any binder, containing an amount of silica ($SiO_2$) of between 1% and 95%, expressed as percentage by weight, preferably between 5% and 95%, in a preferred way between 10% and 80%, in a very preferred way between 20% and 70% and in an even more preferred way between 22% and 45%, said catalyst exhibiting:

a BET specific surface area of 150 m²/g to 600 m²/g and preferably of between 200 m²/g and 600 m²/g,
a mean diameter of the mesopores of between 3 nm and 12 nm, preferably of between 3 nm and 11 nm and very preferably between 4 nm and 10.5 nm,
a pore volume of the pores, the diameter of which is between the mean diameter as defined above, decreased by 3 nm, and the mean diameter as defined above, increased by 3 nm, which is greater than 60% of the total pore volume, preferably greater than 70% of the total pore volume and very preferably greater than 80% of the total pore volume,
a total pore volume of less than 1 ml/g, preferably of between 0.1 and 0.9 ml/g and very preferably between 0.2 and 0.8 ml/g,
a content of alkali metal or alkaline earth metal compounds of less than 300 ppm by weight and preferably of less than 200 ppm by weight.

Preferably, the dispersion of said preferred catalyst used in step b) of the process according to the invention is advantageously between 20% and 100%, preferably between 30% and 100% and very preferably between 40% and 100%.

Preferably, the coefficient of distribution of the noble metal of said preferred catalyst used in step b) of the process according to the invention is greater than 0.1, preferably greater than 0.2 and very preferably greater than 0.4. This coefficient of distribution is measured by an electron probe microanalyser.

During this step e), the fraction entering the reactor undergoes, in contact with the catalyst and in the presence of hydrogen, essentially hydrocracking reactions which, accompanied by hydroisomerization reactions of the n-paraffins, will make it possible to improve the quality of the products formed and more particularly the cold properties of the kerosene and the gas oil, and also to obtain very good yields of middle distillates. The conversion of products having boiling points of greater than or equal to 370° C. to give products having boiling points of less than 370° C. is greater than 50% by weight, often at least 60% and preferably greater than or equal to 70%.

The conversion is defined as:

Conversion of the 370° C.+ to give 370° C.=[(% by weight of the 370° C.−effluent)−(% by weight of the 370° C.−feedstock)]/[100−(% by weight of the 370° C.−feedstock)], with: −% by weight of the 370° C.−effluent=fraction by weight of compounds having boiling points of less than 370° C. in the effluents, % by weight of the 370° C.−feedstock=fraction by weight of compounds having boiling points of less than 370° C. in the hydrocracking and hydroisomerization feedstock.

The effluent resulting from the hydrocracking and hydroisomerization step e) no longer contains olefinic compounds and oxygen-comprising compounds and is cracked and isomerized.

Step f)

The process according to the invention comprises a step f) of fractionation of the mixture of the effluent derived from step e) and the effluent derived from step d) so as to obtain at least one petrol fraction and at least one middle distillates fraction.

Step f) also advantageously allows the fractionation of said mixture into at least one $C_1$-$C_4$ light gases fraction, at least one petrol fraction and at least one kerosene and gas oil middle distillates fraction and an unconverted liquid fraction having an initial boiling point of greater than 340° C., preferably greater than 370° C. and preferably greater than 380° C., also known as UCO or "unconverted oil".

The hydrocarbon-based effluent can advantageously be subjected to an atmospheric distillation and, in some cases, to the combination of an atmospheric distillation and of a vacuum distillation. The aim of the distillation is to carry out a separation between the converted hydrocarbon-based products, that is to say generally having boiling points of less than 340° C., preferably of less than 370° C. and in a preferred way of less than 380° C., and an unconverted liquid fraction (residue) (UCO).

The liquid fraction, unconverted residue, (UCO) containing products having an initial boiling point of greater than 340° C., preferably of greater than 370° C. and in a preferred way of greater than 380° C. and resulting from the distillation is at least partially and preferably completely recycled in the hydrocracking and hydroisomerization step e) of the process according to the invention in order to increase the yield of middle distillates.

Figure 1:
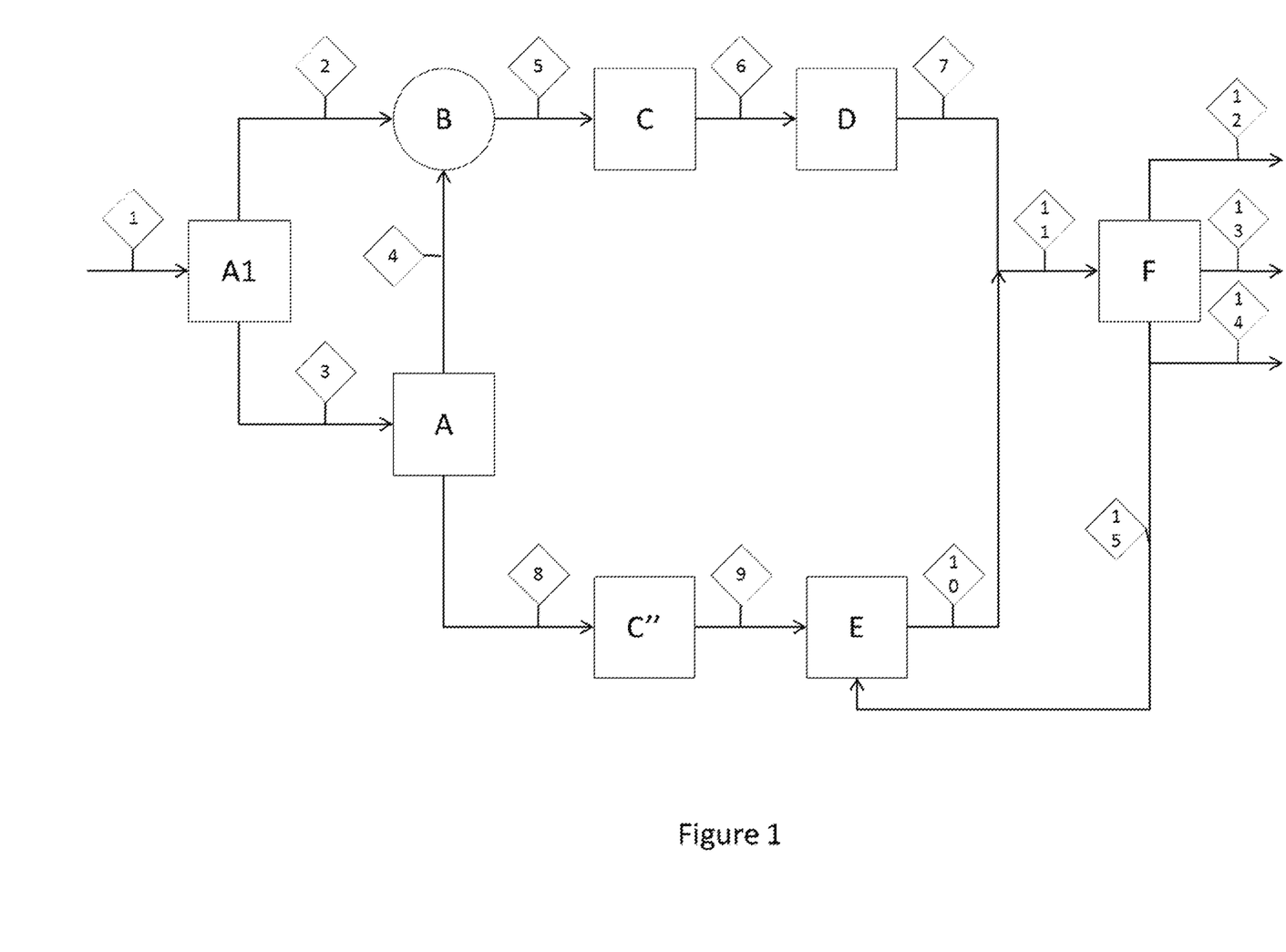
FIG. 1 illustrates Embodiment No. 1 in which all of the light fraction of the cold condensates is sent, as a mixture with a portion of the light fraction of the waxes, to the hydrotreatment step c) then to step d) of hydroisomerization in the presence of the IZM-2-based catalyst.

In FIG. 1, the synthesis gas 1, composed predominantly of carbon monoxide and of hydrogen, is directed to a Fischer-Tropsch synthesis unit (A1). At the outlet of the unit (A1), the effluent is divided into two streams: the hydrocarbon-based fraction 2 or cold condensate, which is sent to the hydrotreatment unit (C), and the heavy fraction 3 or waxes, which is separated, in a separation unit (A), into two fractions, a light fraction 4 having a final boiling point of less than 370° C. and a heavy fraction 8 having an initial boiling point of greater than 370° C. This light cut 4 derived from the heavy fraction 3 is mixed (B) with the cold condensates 2 resulting from the Fischer-Tropsch synthesis (A1). The effluent 5 is then directed to a hydrotreatment unit (C). The effluent 6 resulting from the hydrotreatment step (C) is sent to a hydroisomerization unit (D) after removal of the water not represented in FIG. 1. The effluent 7 produced by the sequence of the hydrotreatment step (C) and the hydroisomerization step (D) no longer contains olefinic compounds and oxygen-comprising compounds and is isomerized.

The heavy fraction 8 resulting from the separation (A) of the waxes 3 produced by the Fischer-Tropsch synthesis can be directed to a hydrotreatment step (C"). This hydrotreatment step (C") is optional as this portion of the effluent contains little in the way of olefins and little in the way of oxygen-comprising compounds, which compounds are mainly present in the light cuts produced by the Fischer-Tropsch synthesis (A1), 2 and 4. The effluent 9 is sent, after removal of the water not represented in FIG. 1, to a hydrocracking and hydroisomerization step (E). The effluent 7 resulting from the hydrotreatment (C) and the hydroisomerization (D) of the light condensates fractions produced by the Fischer-Tropsch synthesis, and the effluent 10 resulting from the hydrotreatment (C") and from the hydrocracking and the hydroisomerization (E), are mixed so as to obtain an effluent 11, before being sent to a separation step (F). On conclusion of this separation step (F), four main streams are produced: a light cut 12 similar to a naphtha, the maximum boiling point of which is less than 180° C., an intermediate cut 13, equivalent to a kerosene with an initial boiling point of greater than 120° C. and a final boiling point of less than 250° C., a heavy cut 14, equivalent of a gas oil composed of product with boiling points of between 120° C. and 370° C., and a very heavy cut 15 corresponding to the fraction not converted in the hydrocracking and hydroisomerization step (E). This effluent 15 perhaps is recycled to the hydrocracking and hydroisomerization step (E).

Figure 2:
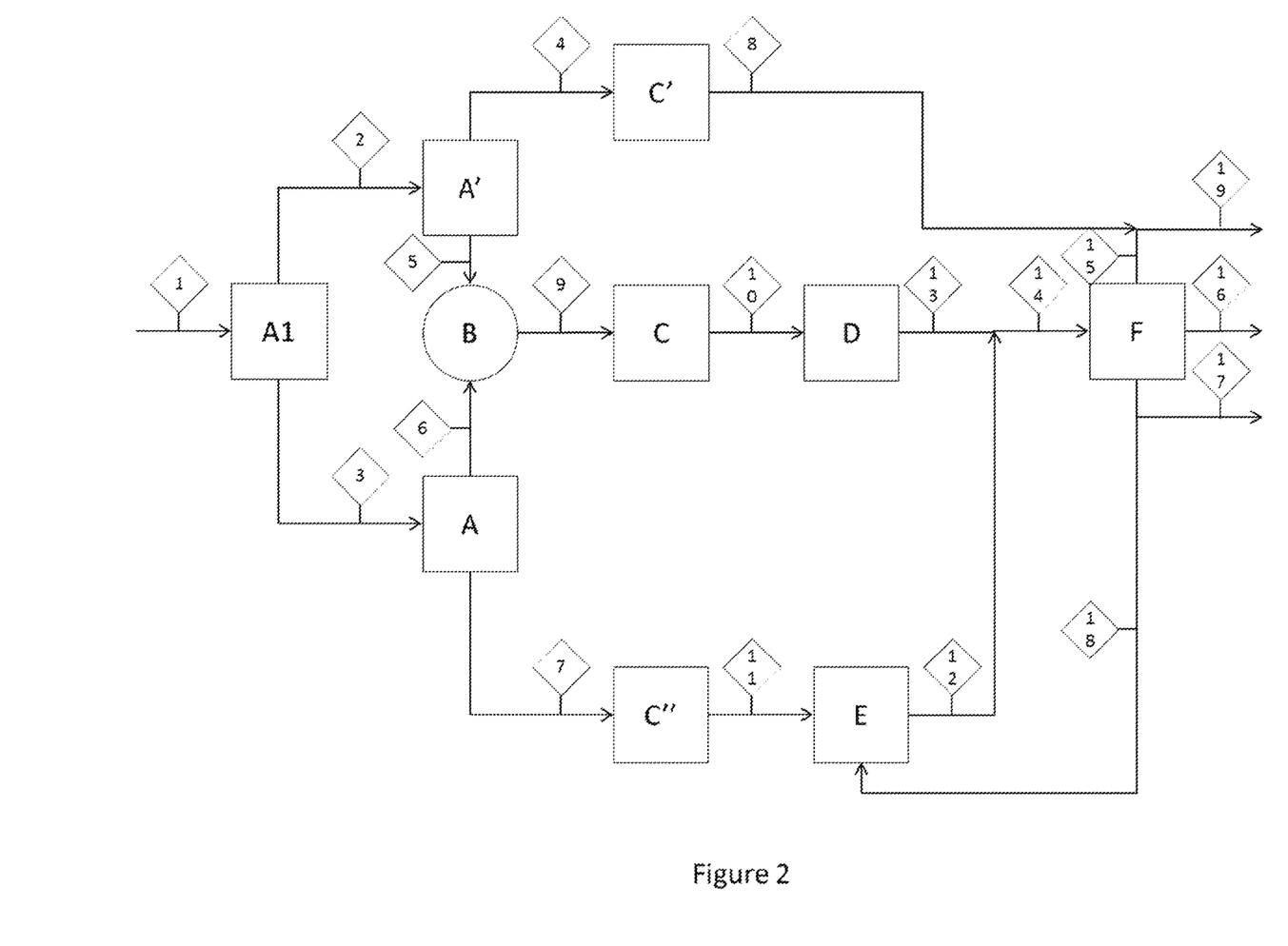
FIG. 2 and FIG. 3 illustrate Embodiments 2 and 3 in which the heavy fraction of the cold condensates, i.e. the middle distillates fraction, is sent, as a mixture with a portion of the light fraction of the waxes, to the hydrotreatment step c) then to step d) of hydroisomerization in the presence of the IZM-2-based catalyst.

In FIG. 2, the synthesis gas 1 is directed to a Fischer-Tropsch synthesis unit (A1). At the outlet of the unit (A1), the effluent is divided into two streams: the hydrocarbon-based fraction 2 or cold condensate, which is sent to a separation step (A'), and the heavy fraction 3 or waxes, which is sent to a separation step (A). The separation (A') is carried out so as to obtain a light cut 4, the final boiling point of which is less than 150° C., and a heavy cut 5, the initial boiling point of which is greater than 150° C. The light cut 4 is sent to a hydrotreatment step (C').

The heavy waxes fraction 3 is separated into two fractions in the separation step (A), a light fraction 6, the final boiling point of which is less than 370° C., and a heavy fraction 7, the initial boiling point of which is greater than 370° C. This light cut 6 resulting from the step (A) of separation of the heavy fraction 3 is mixed (B) with the stream 5 resulting from the separation (A'), so as to form a stream 9. The stream 9 is then directed to a hydrotreatment unit (C). The effluent 10 resulting from the hydrotreatment step (C) is sent to a hydroisomerization unit (D) after removal of the water not represented in FIG. 2. The effluent 13 produced by the sequence of the hydrotreatment step (C) and the hydroisomerization step (D) no longer contains olefinic compounds and oxygen-comprising compounds and is isomerized. The heavy fraction of the waxes 7 resulting from the separation (A) can be directed to a hydrotreatment step (C"). This hydrotreatment step (C") is optional as this portion of the effluent contains little in the way of olefins and little in the way of oxygen-comprising compounds, which compounds are mainly present in the light cuts produced by the Fischer-Tropsch synthesis (A1), 2 and 6. The effluent 11 resulting from (C") is sent, after removal of the water not represented in FIG. 2, to a hydrocracking and hydroisomerization step (E). The effluent 12 produced by the sequence of the hydrotreatment step (C") and the hydrocracking and hydroisomerization step (E) no longer contains olefinic compounds and oxygen-comprising compounds, is cracked and is isomerized. The effluents 12 and 13 are mixed in the stream 14 and sent to a separation step (F). On conclusion of this separation step (F), four main streams are produced: a light cut 15 similar to a naphtha, the maximum boiling point of which is less than 180° C., an intermediate cut 16, equivalent to a kerosene with an initial boiling point of greater than 120° C. and a final boiling point of less than 250° C., a heavy cut 17, equivalent of a gas oil composed of product with boiling points of between 180° C. and 370° C., and a very heavy cut 18 corresponding to the fraction not converted in the hydrocracking and hydroisomerization step (E). This effluent 18 perhaps is recycled to the hydrocracking/hydroisomerization step (E).

The effluent 15 produced by the distillation is mixed with the stream 8 resulting from the hydrotreatment (C') so as to form the stream 19, similar to a naphtha.

Figure 3:
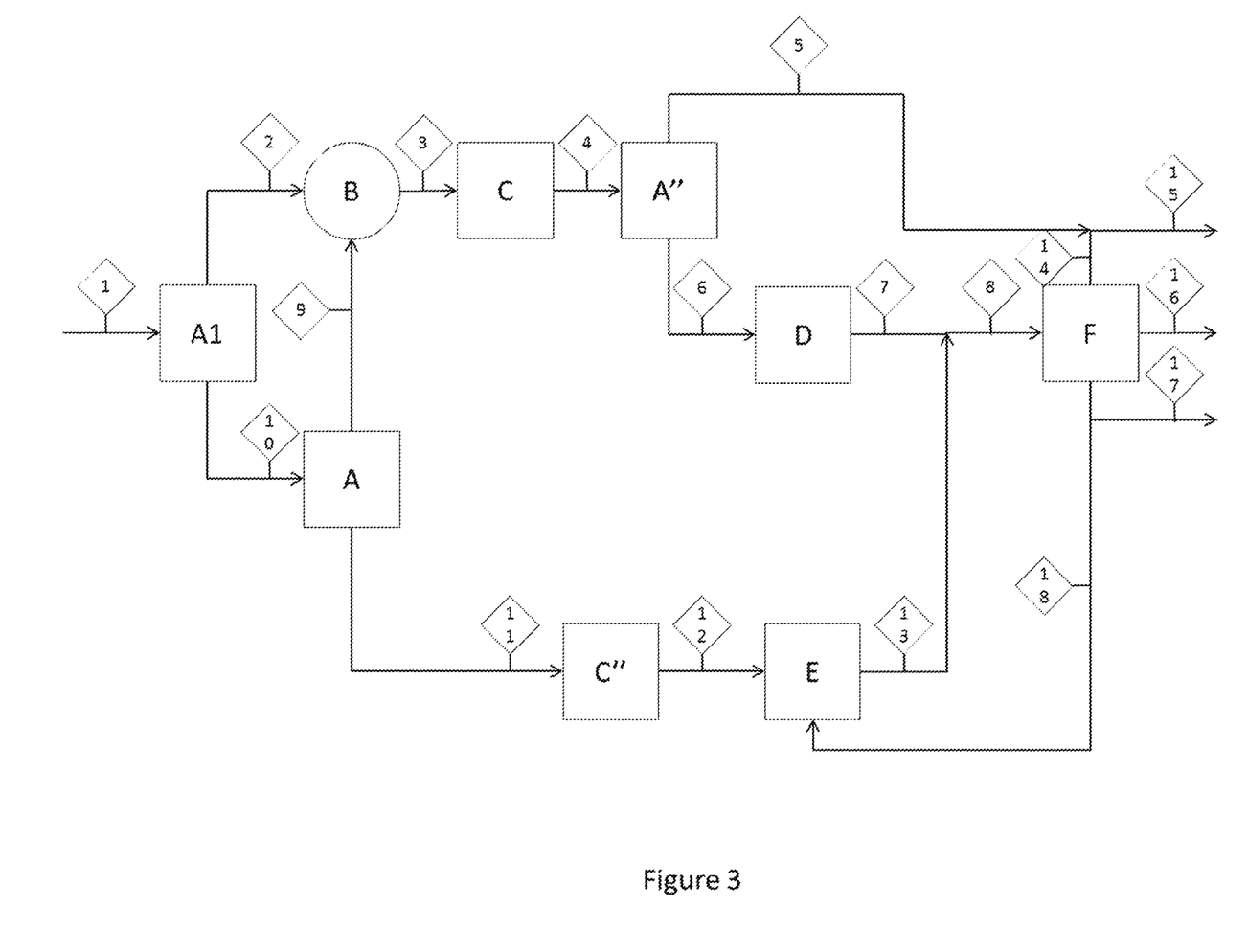

In FIG. 3, the synthesis gas 1 is directed to a Fischer-Tropsch synthesis unit (A1). At the outlet of the unit (A1), the effluent is divided into two streams: the hydrocarbon-based fraction 2 or condensates and the heavy fraction 10 or waxes, which is sent to a separation step (A). The heavy fraction 10 is separated into two fractions: a light fraction of the waxes 9, the final boiling point of which is less than 370° C., and a heavy fraction of the waxes 11, the final boiling point of which is greater than 370° C.

This light cut 9 resulting from the heavy fraction of the waxes 10 is mixed (B) with the hydrocarbon-based fraction 2 or condensates resulting from the Fischer-Tropsch synthesis (A1), so as to obtain a stream 3.

The stream 3 is then directed to a hydrotreatment unit (C). The effluent 4 resulting from the hydrotreatment step (C) is sent to a separation step (A"). The separation (A") is carried out so as to obtain a light cut 5, the final boiling point of which is less than 150° C., and a heavy cut 6, the initial boiling point of which is greater than 150° C.

The heavy fraction 6 is directed to a hydroisomerization step (D) after removal of the water not represented in the figure. The effluent 7 produced by the sequence of the hydrotreatment step (C), the separation step (A") and the hydroisomerization step (D) no longer contains olefinic compounds and oxygen-comprising compounds and is isomerized.

The heavy cut 11 resulting from the separation (A) of the waxes 10 produced by the Fischer-Tropsch synthesis (A1) can be directed to a hydrotreatment step (C") which is optional as this portion of the effluent contains little in the way of olefins and little in the way of oxygen-comprising compounds, which compounds are mainly present in the light cuts produced by the Fischer-Tropsch synthesis (A1), 2 and 9. The effluent 12 is sent, after removal of the water not represented in FIG. 3, to a hydrocracking and hydroisomerization step (E). The effluent 13 produced by the sequence of the hydrotreatment step (C") and the hydroisomerization step (E) no longer contains olefinic compounds and oxygen-comprising compounds, is cracked and is isomerized. The effluents 7 and 13 are mixed in the stream 8 and sent to a separation step (F). On conclusion of this separation step (F), four main streams are produced: a light cut 14 similar to a naphtha, the maximum boiling point of which is less than 180° C., an intermediate cut 16, equivalent to a kerosene with an initial boiling point of greater than 120° C. and a final boiling point of less than 250° C., a heavy cut 17, equivalent of a gas oil composed of product with boiling points of between 180° C. and 370° C., and a very heavy cut 18 corresponding to the fraction not converted in the hydrocracking and hydroisomerization step (E). This effluent 18 perhaps is recycled to the hydrocracking/hydroisomerization step (E).

The effluent 14 produced by the distillation can be mixed with the effluent 5 so as to form the stream 15, similar to a naphtha.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1856669, filed Jul. 18, 2018 are incorporated by reference herein.

The examples illustrate the invention without limiting the scope thereof.

Example 1: Preparation of the IZM-2-Based Catalyst C1

The catalyst C1 is a catalyst containing a noble metal and the zeolite IZM-2. This zeolite IZM-2 was synthesized in accordance with the teaching of Patent Application FR 2 918 050. The crude synthesis IZM-2 zeolite then undergoes calcination at 550° C. for ten hours (temperature increase gradient of 5° C./min) in a traversed bed under dry air (2 standard litres per hour and per gram of solid). The solid obtained is refluxed for 4 hours in an ammonium nitrate solution (100 ml of solution per gram of solid, ammonium chloride concentration of 10M) so as to exchange the alkali metal cations with ammonium ions. This refluxing step is performed four times. The solid thus obtained has an Si/Al ratio (determined by X-ray fluorescence) of 53. This zeolite is blended with an alumina gel of SB3 type supplied by the company Condéa-Sasol. The blended paste is extruded through a 1.4 mm die. After drying in an oven overnight at 110° C., the extrudates are calcined at 500° C. for two hours (temperature increase gradient of 5° C./min) in a traversed bed under dry air (2 standard litres per hour and per gram of solid). The extrudates are then dry-impregnated with an aqueous solution of tetraamineplatinum nitrate $Pt(NH_3)_4(NO_3)_2$, left to mature in a water maturator for 24 hours at ambient temperature, then calcined at 500° C. (temperature increase gradient of 5° C./min) for two hours in a traversed bed under dry air (2 standard litres per hour and per gram of solid). The weight contents of the zeolite IZM-2 and of the platinum on the finished catalyst after calcination are respectively 20% and 0.32% by weight.

Example 2 (in Accordance with the Invention)

Example 2 illustrates the embodiment according to FIG. 1.

The effluent resulting from the Fischer-Tropsch synthesis unit is, at the outlet of the Fischer-Tropsch synthesis unit, divided into two fractions: a light fraction, known as cold condensate, and a heavy fraction, known as waxes.

The characteristics of the various fractions are given in Table 1 below:

TABLE 1 composition of the various fractions

| | | Cold condensate | Waxes |
|---|---|---|---|
| C1-C4 | [wt %] | 1 | 0 |
| C5-C9 | [wt %] | 35 | 1 |
| C10-C22 | [wt %] | 61 | 26 |
| C22+ | [wt %] | 3 | 73 |
| Paraffins | [wt %] | 74 | 96 |
| Olefins | [wt %] | 19 | 2 |
| Oxygen-comprising compounds | [wt %] | 7 | 2 |

Said heavy fraction, known as waxes, is separated in a distillation column into a light fraction, the final boiling point of which is less than 370° C., and a heavy fraction which boils above said light fraction.

Said light fraction, the final boiling point of which is less than 370° C., is mixed with all of said cold condensate fraction.

The mixture is then sent to a step of hydrotreatment in the presence of a hydrotreatment catalyst in its reduced form comprising 11.4% by weight of NiO and 8% by weight of $MoO_3$ on an alumina support and which operates at a temperature of 335° C., at a pressure of 0.65 MPa, at a hydrogen flow rate adjusted in order to obtain a ratio of 600 standard litres per litre, and at an hourly space velocity of 2 $h^{-1}$.

The effluent at the outlet of the hydrotreatment step no longer contains oxygen-comprising compounds or olefins and is 100% paraffinic.

All of the effluent resulting from step c) is sent to a step d) of hydroisomerization in the presence of the hydroisomerization catalyst C1, step d) being carried out at a temperature of 330° C., at a pressure of 0.65 MPa, at a space velocity of 600 $h^{-1}$, and at a hydrogen flow rate adjusted in order to obtain a ratio of 2 standard litres of hydrogen per litre of feedstock.

The isomerized effluent is then sent to the fractionation step f) in order to obtain a petrol fraction, a middle distillates fraction (kerosene and gas oil) and an unconverted fraction.

In parallel, the heavy fraction of the waxes which boils above said light fraction, that is to say at a boiling point of greater than 370° C., is sent to a step e) of hydrocracking and of hydroisomerization in the presence of a hydrocracking and hydroisomerization catalyst comprising 0.3% by weight of Pt on an SiAl support and which operates at a temperature of 360° C., at a pressure of 0.65 MPa, at a space velocity of 2 $h^{-1}$, and at a hydrogen flow rate adjusted in order to obtain a ratio of 600 standard litres of hydrogen per litre of feedstock.

The effluent resulting from the hydrocracking and hydroisomerization step e) is subsequently also sent to the fractionation step f) in order to separate a petrol fraction, a middle distillates fraction (kerosene and gas oil) and an unconverted fraction which is sent back to step e).

The material balance according to the scheme is given in Table 2. As the hydrogen consumption is very low, it is disregarded in this example.

TABLE 2

Material balance according to the principle scheme 1, with reference to the streams of FIG. 1

| Stream | [—] | 2 | 3 | 4 | 5 | 7 | 8 | 10 | 12 | 13 + 14 |
|---|---|---|---|---|---|---|---|---|---|---|
| Flow rate | [t/h] | 55 | 45 | 11 | 66 | 66 | 34 | 34 | 22 | 78 |

The flow rate of middle distillate is increased by 4 wt % relative to Example 5 illustrating a scheme not in accordance with the invention.

Example 3 (in Accordance with the Invention)

Example 3 illustrates the embodiment according to FIG. 2.

Example 3 is carried out like Example 2, the only difference being that it is the heavy fraction of the condensate fraction resulting from the Fischer-Tropsch process which is sent, as a mixture with the light fraction of the waxes, to the step of hydroisomerization on an IZM-2-based catalyst, and not all of the condensate fraction.

The effluent resulting from the Fischer-Tropsch synthesis unit is, at the outlet of the Fischer-Tropsch synthesis unit, divided into two fractions: a light fraction, known as cold condensate, and a heavy fraction, known as waxes.

The characteristics of the various fractions are given in Table 1 above.

Said heavy fraction, known as waxes, is separated in a distillation column (step a) into a light fraction, the final boiling point of which is less than 370° C., and a heavy fraction which boils above said light fraction.

The cold condensate fraction is separated in a distillation column (step a') into a light fraction of said cold condensate fraction, the final boiling point of which is less than 150° C., and a heavy fraction which boils above said light fraction, having an initial boiling point of greater than 150° C. and a final boiling point of less than 370° C.

Said heavy fraction of the cold condensate fraction separated in step a') corresponds to a fraction which boils in the middle distillate temperature range (120-370° C.).

Said light fraction of the waxes fraction (separated in step a), the final boiling point of which is less than 370° C., is mixed with the heavy fraction of said cold condensate fraction (separated in step a') corresponding to the middle distillates fraction (120-370° C.).

The mixture is sent to a step c) of hydrotreatment in the presence of a hydrotreatment catalyst in its reduced form comprising 11.4% by weight of NiO and 8% by weight of $MoO_3$ on an alumina support and which operates at a temperature of 335° C., at a pressure of 0.65 MPa, at a hydrogen flow rate adjusted in order to obtain a ratio of 600 standard litres per litre, and at an hourly space velocity of 2 $h^{-1}$.

All of the effluent resulting from step c) is sent to a step d) of hydroisomerization in the presence of the hydroisomerization catalyst C1, step d) being carried out at a temperature of 330° C., at a pressure of 0.65 MPa, at a space velocity of 2 $h^{-1}$, and at a hydrogen flow rate adjusted in order to obtain a ratio of 600 standard litres of hydrogen per litre of feedstock.

The isomerized effluent is then sent to the fractionation step f) in order to obtain a petrol fraction, a middle distillates fraction (kerosene and gas oil) and an unconverted fraction.

The light fraction of the cold condensates fraction having a final boiling point of less than 150° C. (separated in step a') is mixed with the petrol cut separated in the fractionation step f).

In parallel, the heavy fraction of the waxes which boils above said light fraction, that is to say at a boiling point of greater than 370° C., is sent to a step e) of hydrocracking and of hydroisomerization in the presence of a hydrocracking and hydroisomerization catalyst comprising 0.3% by weight of Pt on an SiAl support and which operates at a temperature of 360° C., at a pressure of 0.65 MPa, at a space velocity of 2 $h^{-1}$, and at a hydrogen flow rate adjusted in order to obtain a ratio of 600 standard litres of hydrogen per litre of feedstock.

The effluent resulting from the hydrocracking and hydroisomerization step e) is subsequently also sent to the fractionation step f) in order to separate a petrol fraction, a middle distillates fraction (kerosene and gas oil) and an unconverted fraction which is sent back to step e).

The material balance according to the scheme is given in Table 3. As the hydrogen consumption is very low, it is disregarded in this example.

TABLE 3

Material balance according to the principle scheme 2, with reference to the streams of FIG. 2

| Stream | [—] | 2 | 3 | 4 | 5 | 6 | 7 | 8 | 9 | 12 | 13 | 15 | 16 + 17 | 19 |
|---|---|---|---|---|---|---|---|---|---|---|---|---|---|---|
| Flow rate | [t/h] | 55 | 45 | 17 | 38 | 11 | 34 | 17 | 49 | 34 | 49 | 5 | 78 | 22 |

The flow rate of middle distillate is increased by 4 wt % relative to the scheme of Example 5 not in accordance with the invention.

Example 4 (in Accordance with the Invention)

Example 4 illustrates the embodiment according to FIG. 3.

The effluent resulting from the Fischer-Tropsch synthesis unit is, at the outlet of the Fischer-Tropsch synthesis unit, divided into two fractions: a light fraction, known as cold condensate, and a heavy fraction, known as waxes.

The characteristics of the various fractions are given in Table 1 above.

Said heavy fraction, known as waxes, is separated in a distillation column (step a) into a light fraction, the final boiling point of which is less than 370° C., and a heavy fraction which boils above said light fraction.

Said light fraction, the final boiling point of which is less than 370° C., is mixed with all of said cold condensate fraction.

The mixture is then sent to a step of hydrotreatment in the presence of a hydrotreatment catalyst in its reduced form comprising 11.4% by weight of NiO and 8% by weight of $MoO_3$ on an alumina support and which operates at a temperature of 330° C., at a pressure of 0.65 MPa, at a hydrogen flow rate adjusted in order to obtain a ratio of 600 standard litres per litre, and at an hourly space velocity of 2 $h^{-1}$.

The effluent resulting from the hydrotreatment step is then separated in a distillation column (step a'') so as to obtain a light fraction, the final boiling point of which is less than 150° C., and a heavy fraction, the initial boiling point of which is greater than 150° C. and the final boiling point of which is less than 370° C., said heavy fraction corresponding to the middle distillates fraction.

The heavy fraction of the effluent resulting from the hydrotreatment step c) corresponding to the middle distillates fraction is sent to a step d) of hydroisomerization in the presence of the hydroisomerization catalyst C1, step d) being carried out at a temperature of 330° C., at a pressure of 0.65 MPa, at a space velocity of 2 $h^{-1}$, and at a hydrogen flow rate adjusted in order to obtain a ratio of 600 standard litres of hydrogen per litre of feedstock.

The isomerized effluent is then sent to the fractionation step f) in order to obtain a petrol fraction, a middle distillates fraction (kerosene and gas oil) and an unconverted fraction.

In parallel, the heavy fraction of the waxes which boils above said light fraction, that is to say at a boiling point of greater than 370° C., is sent to a step e) of hydrocracking and of hydroisomerization in the presence of a hydrocracking and hydroisomerization catalyst comprising 0.3% by weight of Pt on an SiAl support and which operates at a temperature of 360° C., at a pressure of 0.65 MPa, at a space velocity of 2 $h^{-1}$, and at a hydrogen flow rate adjusted in order to obtain a ratio of 600 standard litres of hydrogen per litre of feedstock.

The effluent resulting from the hydrocracking and hydroisomerization step e) is subsequently also sent to the fractionation step f) in order to separate a petrol fraction, a middle distillates fraction (kerosene and gas oil) and an unconverted fraction which is sent back to step e).

The light fraction of the effluent resulting from the hydrotreatment step c) having a final boiling point of less than 150° C. (separated in step a'') is mixed with the petrol cut separated in the fractionation step f).

The material balance according to the scheme is given in Table 4. As the hydrogen consumption is very low, it is disregarded in this example.

TABLE 4

Material balance according to the principle scheme 3, with reference to the streams of FIG. 3

| Stream | [—] | 2 | 10 | 9 | 3 | 5 | 6 | 11 | 7 | 13 | 15 | 16 + 17 |
|---|---|---|---|---|---|---|---|---|---|---|---|---|
| Flow rate | [t/h] | 55 | 45 | 11 | 66 | 17 | 49 | 34 | 49 | 34 | 22 | 78 |

The flow rate of middle distillate is increased by 4 wt % relative to the scheme of Example 5 not in accordance with the invention.

Example 5 (not in Accordance with the Invention)

Figure 4:
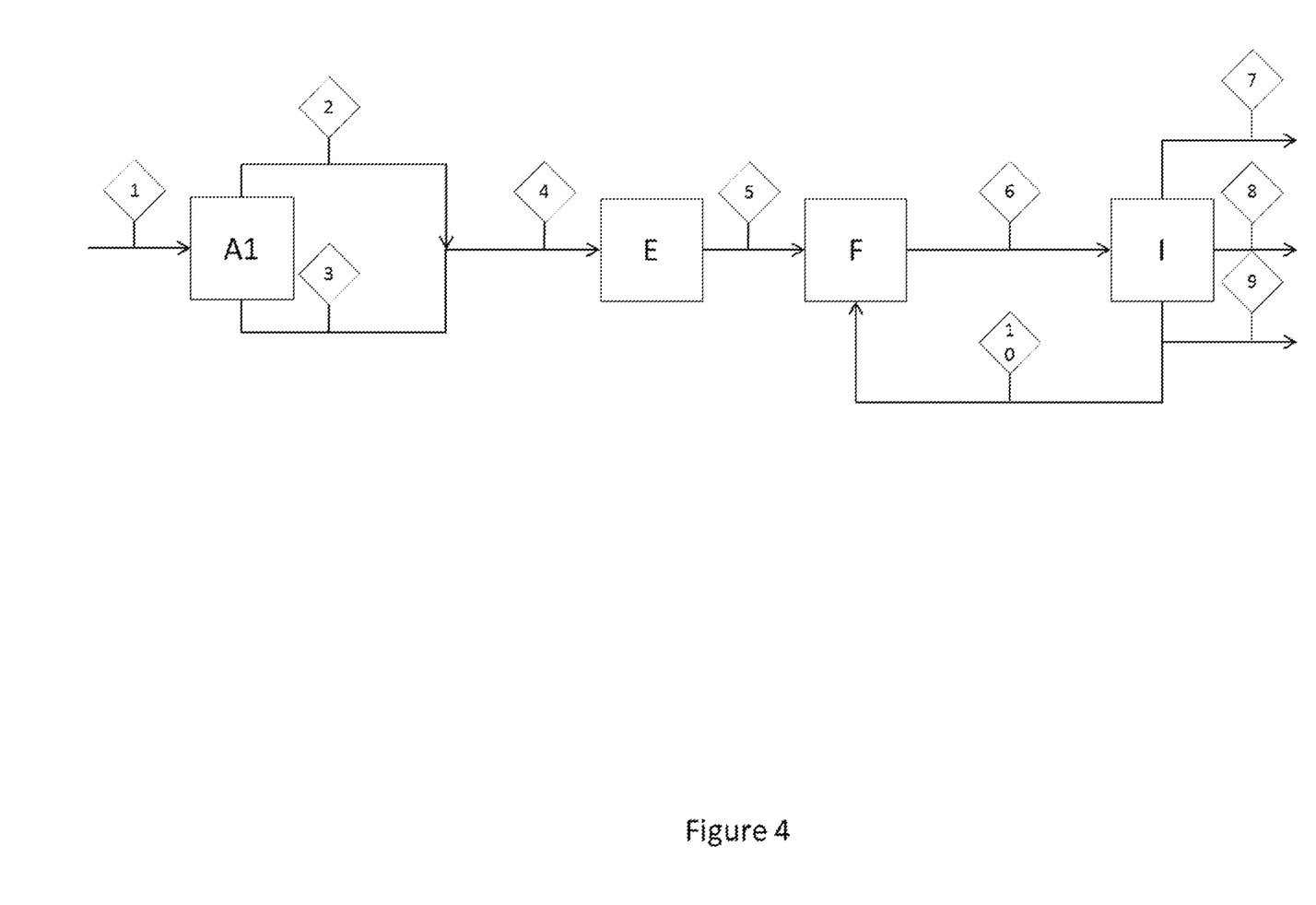
FIG. 4 illustrates the prior art in which the two effluents resulting from the Fischer-Tropsch synthesis, the light fraction, which is known as cold condenate, and the heavy fraction, which is known as waxes, are mixed, then simultaneously hydrotreated and, finally, simultaneously hydrocracked/hydroisomerized on the IZM-2-based catalyst C1. Reference will be made to FIG. 4 in Example 5.

Example 5 is not in accordance with the invention in that the two effluents resulting from the Fischer-Tropsch synthesis, the light fraction, known as cold condensate (2), and the heavy fraction, known as waxes (3), are mixed in a stream 4, then simultaneously hydrotreated in a zone E and, finally, simultaneously hydrocracked/hydroisomerized in a zone F via a stream 5 on the IZM-2-based catalyst C1 according to a scheme represented in FIG. 4.

The effluent resulting from the hydrocracking/hydroisomerization step 6 is then sent to a fractionation step, from which a naphtha cut 7 and a middle distillates fraction 8 and 9 are obtained. The unconverted fraction 10 is recycled to the hydrocracking/hydroisomerization step F.

The operating conditions and the catalysts used in Example 5 are identical to those used in Example 2 according to the invention in the hydrotreatment and hydrocracking/hydroisomerization steps.

The material balance according to the scheme is given in Table 5. As the hydrogen consumption is very low, it is disregarded in this example.

TABLE 5

Material balance according to the scheme of the prior art 4 with reference to the streams of FIG. 4

| | | Description | | | |
|---|---|---|---|---|---|
| | [—] | Condensates | Waxes | Naphtha | Middle distillate |
| Stream | [—] | 2 | 3 | 7 | 8 + 9 |
| Flow rate | [t/h] | 55 | 45 | 25 | 75 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for producing middle distillates from a paraffinic feedstock produced by Fischer-Tropsch synthesis and divided into two fractions, a light fraction, known as cold condensate, and a heavy fraction, known as waxes, comprising at least the following steps:
   a) fractionation of said heavy fraction, known as waxes, so as to obtain a light fraction of the waxes, the final boiling point of which is between 350° C. and 400° C., and a heavy fraction of the waxes which boils above said light fraction,
   b) mixing of said light fraction of the waxes, the final boiling point of which is between 350° C. and 400° C. derived from step a) with at least one portion of said cold condensate fraction,
   c) hydrotreatment of the mixture derived from step b) in the presence of a hydrotreatment catalyst and which operates at a temperature of between 250 and 450° C., at a pressure of between 0.5 and 15 MPa, at a hydrogen flow rate adjusted in order to obtain a ratio of between 100 and 3000 standard litres per litre, and at an hourly space velocity of between 0.1 and 40 $h^{-1}$,
   d) hydroisomerization of at least one portion of the effluent derived from step c) in the presence of a catalyst comprising at least one noble metal from Group VIII of the Periodic Table and at least one zeolite IZM-2, step d) operating at a temperature of between 200 and 450° C., a pressure of between 1 and 15 MPa, a space velocity of between 0.1 and 10 $h^{-1}$ and a hydrogen flow rate adjusted in order to obtain a ratio of between 100 and 2000 standard litres of hydrogen per litre of feedstock,
   e) hydrocracking and hydroisomerization of at least one portion of the heavy fraction of the waxes derived from step a) in the presence of a hydrocracking catalyst and operating at a temperature of between 250° C. and 450° C., at a pressure of between 0.2 and 15 MPa, at a space velocity of between 0.1 $h^{-1}$ and 10 $h^{-1}$, and at a hydrogen flow rate adjusted in order to obtain a ratio of between 100 and 2000 standard litres of hydrogen per litre of feedstock, and
   f) fractionation of the mixture of the effluent derived from step e) and the effluent derived from step d) so as to obtain at least one petrol fraction and at least one middle distillates fraction.

2. The process according to claim 1, in which said light fraction of the waxes, separated in step a), is mixed with all of said cold condensate fraction.

3. The process according to claim 1, in which the process further comprises a step a') of fractionation of the cold condensate fraction so as to obtain a light fraction of said cold condensate fraction, the final boiling point of which is between 120 and 200° C., and a heavy fraction of said cold condensate fraction which boils above said light fraction, having an initial boiling point of between 80° C. and 200° C.

4. The process according to claim 3, in which said light fraction of said cold condensate fraction separated in said step a') is sent to a hydrotreatment step c') which operates at a temperature of between 150 and 430° C., at a pressure of between 0.5 and 15 MPa, at a hydrogen flow rate adjusted in order to obtain a ratio of between 150 and 1500 standard litres per litre, and at an hourly space velocity of between 0.2 and 20 $h^{-1}$.

5. The process according to claim 4, in which the effluent resulting from step c') is mixed with the petrol effluent resulting from the fractionation step f).

6. The process according to claim 1, in which said hydroisomerization step d) is carried out at a temperature of between 300 and 450° C., at a pressure of between 1 and 9 MPa, at a space velocity of between 0.5 and 5 $h^{-1}$ and at a hydrogen flow rate adjusted in order to obtain a ratio of between 150 and 1500 litres of hydrogen per litre of feedstock.

7. The process according to claim 1, in which all of the effluent resulting from step c) is sent to the hydroisomerization step d).

8. The process according to claim 1, in which the process further comprises a step a") of fractionation of the effluent resulting from the hydrotreatment step c) so as to obtain a light fraction of said effluent, the final boiling point of which is between 120 and 200° C., and a heavy fraction of said effluent which boils above said light fraction, having an initial boiling point of between 120 and 200° C. and a final boiling point of between 350° C. and 400° C.

9. The process according to claim 8, in which said light fraction of said effluent, the final boiling point of which is between 120 and 200° C., separated in step a"), is mixed with the petrol effluent resulting from the fractionation step f).

10. The process according to claim 1, in which the process further comprises a step c") of hydrotreatment of said heavy fraction of the waxes resulting from step a), prior to said hydrocracking and hydroisomerization step e).

11. The process according to claim 1, wherein the final boiling point of the light fraction of the waxes is between 360° C. and 380° C.

12. The process according to claim 11, wherein the final boiling point of the light fraction of the waxes is between 360° C. and 370° C.

13. The process according to claim 1, wherein the hydrocracking and hydroisomerization in step e) is of the entire heavy fraction of the waxes derived from step a).

* * * * *